Figure 1:
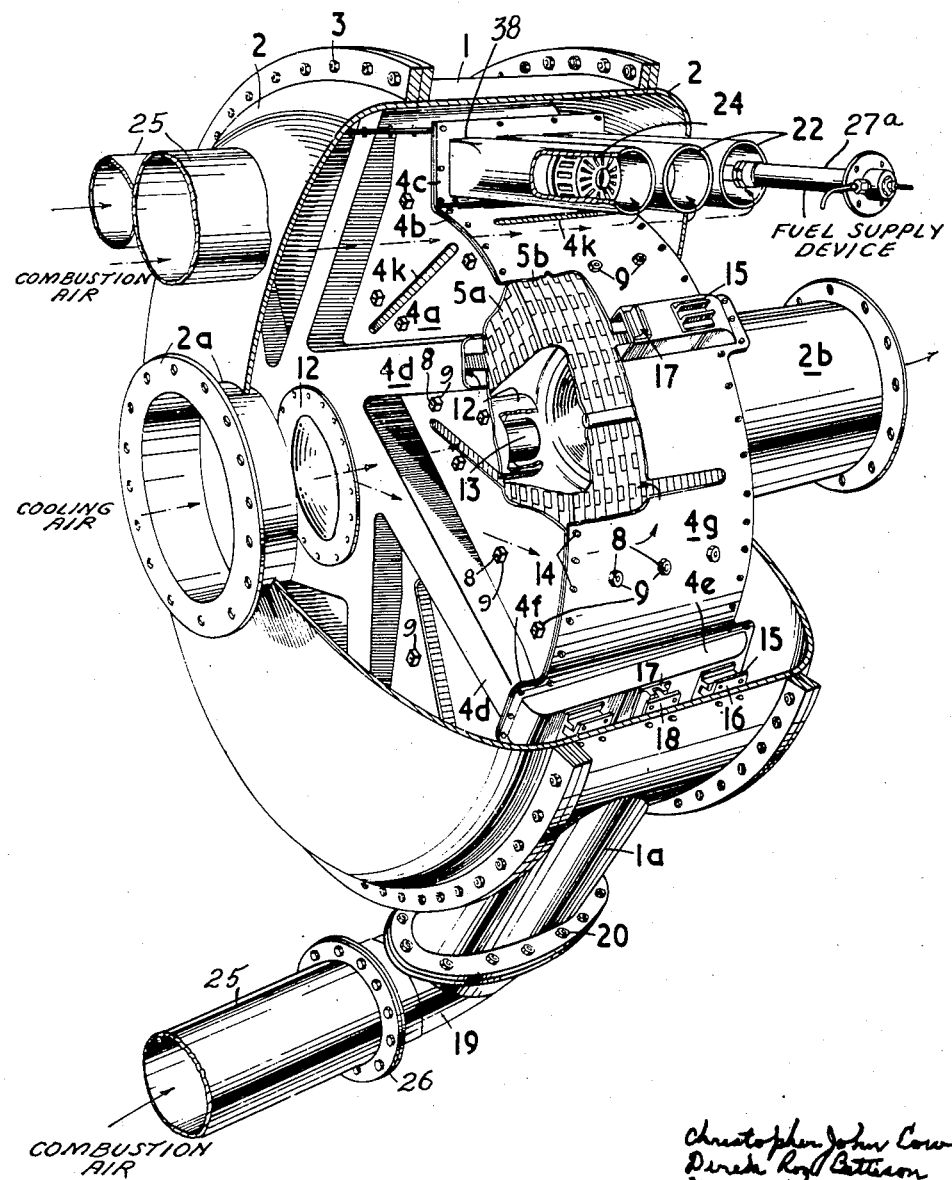

April 1, 1958   C. J. COWLIN ET AL   2,828,608
IMPROVED CONSTRUCTION OF COMBUSTION CHAMBER
OF THE CYCLONE OR VORTEX TYPE
Filed Nov. 5, 1951   4 Sheets-Sheet 2

United States Patent Office 2,828,608
Patented Apr. 1, 1958

2,828,608

IMPROVED CONSTRUCTION OF COMBUSTION CHAMBER OF THE CYCLONE OR VORTEX TYPE

Christopher John Cowlin, Cove, Farnborough, Derek Roy Bettison, Guildford, and Martin Cox, Cove, Farnborough, England, assignors to Power Jets (Research and Development) Limited, London, England, a company of Great Britain Application November 5, 1951, Serial No. 254,882

Claims priority, application Great Britain November 17, 1950

11 Claims. (Cl. 60—39.32)

This invention relates to a so-called cyclone or vortex type combustion chamber—i. e. one wherein fuel particles are burnt in air which enters the chamber tangentially, or nearly so, and moves from the periphery inwards with a vortex motion towards the axis of the chamber and so into an axially-extending central outlet for the combustion products. Such a combustion chamber may be used for example in a gas turbine power plant.

This type of combustion chamber makes possible the burning of pulverized solid fuel and certain heavy fuel oils but owing to the high temperature of operation it has hitherto been necessary to make such a combustion chamber of refractory material for satisfactory operation and the prospect of a reasonably long life. The object of the invention is to improve the operation and increase the life of the chamber by provision for adequate cooling and absence of thermal distortion, and in particular to allow the combustion chamber to be of steel instead of refractory material.

According to the primary feature of the invention the combustion chamber is enclosed within but spaced from an outer pressure casing to which it is attached by means permitting a certain amount of expansion and contraction of the combustion chamber without distortion, the outer casing having an inlet and outlet for the flow of cooling air through the space between this casing and the combustion chamber. The construction can be such that the cooling air washes over substantially the whole exterior surface of the combustion chamber. A further important feature consists in forming the combustion chamber with hollow walls through the interior of which cooling air can flow—preferably in a number of separate paths in parallel.

In a preferred construction the main structure of the combustion chamber is made up of hollow ribs attached to the outer chamber as aforesaid; these ribs support and stiffen the hollow walls and serve also as conduits for cooling air passing through these walls. The combustion chamber walls may be in separate sectors—which may in turn be circumferentially divided— joined together in a manner permitting a certain amount of relative expansion and contraction.

The cooling air, or some of it, may form at least part of the combustion air. Preferably, some or all of the cooling air joins and mixes with the combustion products in the outlet from the combustion chamber. In particular, the cooling air is discharged into this outlet in two streams—an inner stream, which mixes readily with the combustion gases, and an annular outer stream which washes over and tends to cool the inner surface of the wall of the discharge outlet. These airstreams should be given a swirl in the same direction as the combustion products; the kinetic energy of swirl of the whole exhaust stream can then be recovered to some extent in a suitably designed exhaust volute or in the first stage of the turbine if the combustion chamber be mounted co-axially therewith.

Figure 2:
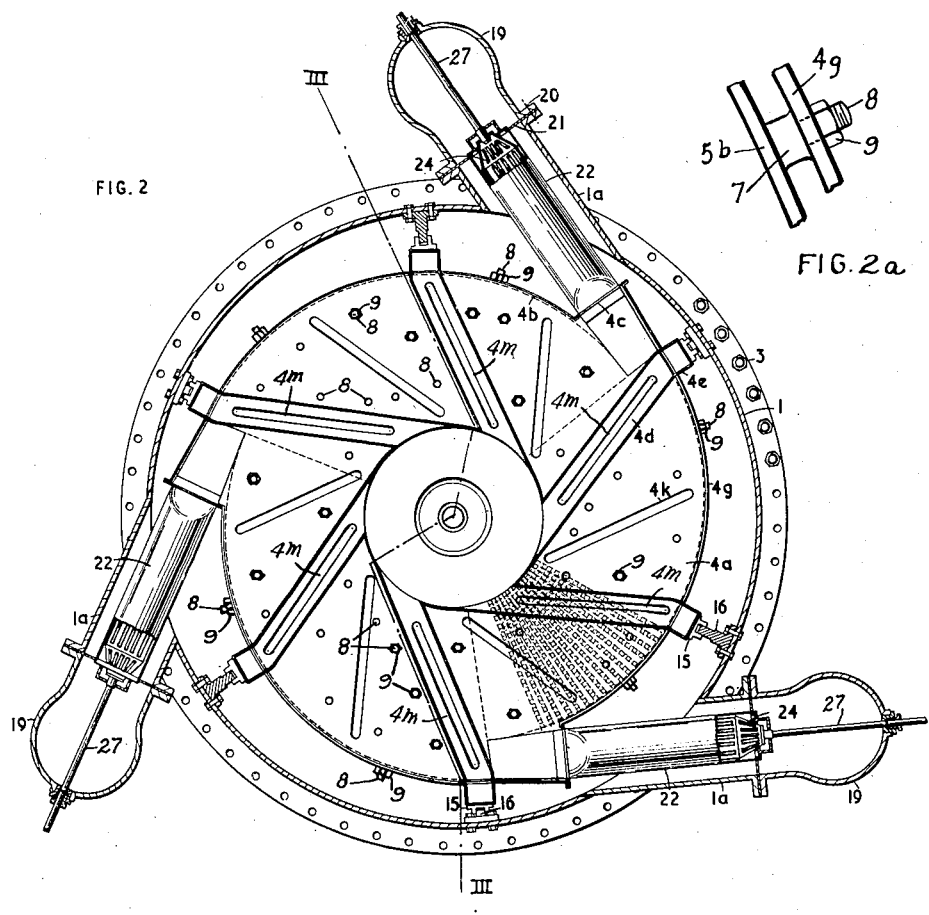
Figure 3:
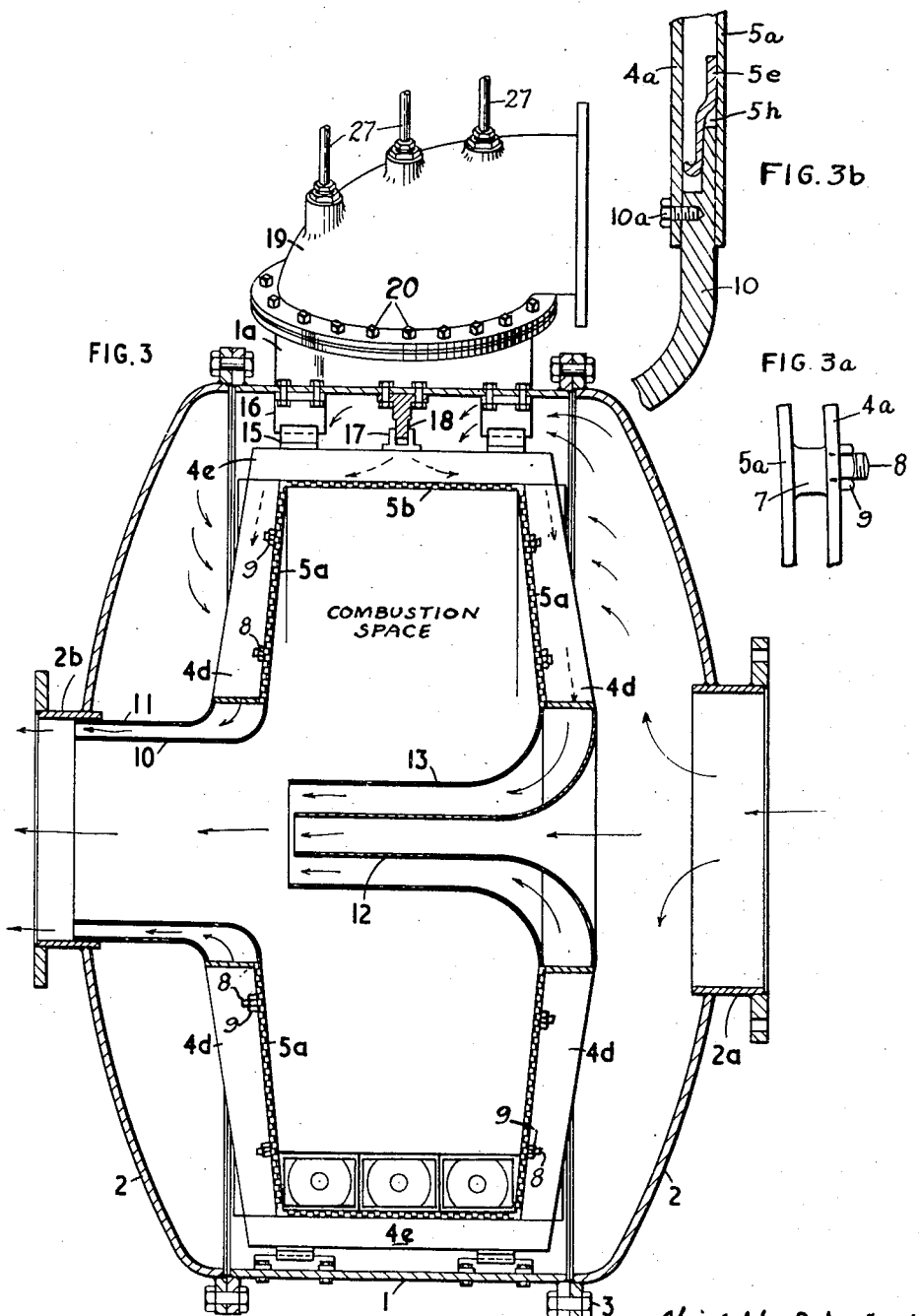
Figure 4:
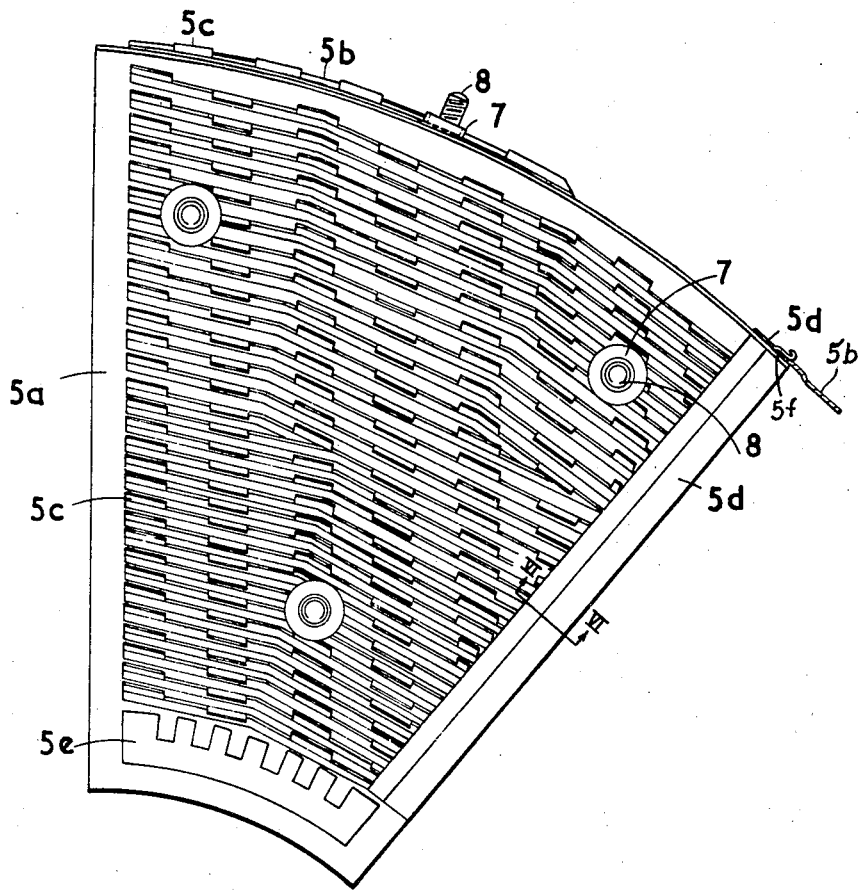
Figures 5, 6:
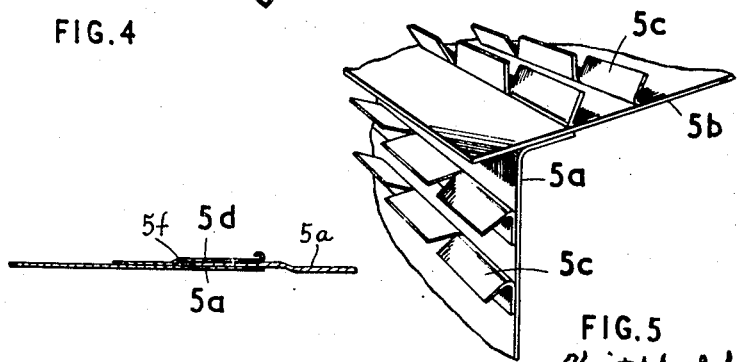

One particular construction according to the invention is shown in the accompanying drawings of which:

Fig. 1 is an isometric view of the complete device showing the inlet end of the combustion chamber, partly cut away to reveal the interior, Fig. 2 is a diametral cross-section looking from the outlet end of the combustion chamber, Fig. 2a shows a detail of Fig. 2 to an enlarged scale, Fig. 3 is an axial section looking from the rear of Fig. 1 on the line III—III in Fig. 2, Fig. 3a shows a detail of Fig. 3 to an enlarged scale, Fig. 3b shows a further detail of Fig. 3 to an enlarged scale, Fig. 4 is a view of an element of the combustion chamber wall, Fig. 5 is an isometric view of a detail of the same element, Fig. 6 is a sectional view on the line VI—VI in Fig. 4.

In Figs. 1, 2 and 3 the outer pressure casing is made up of a flanged cylindrical body 1 (apertured as hereinafter described) and peripherally-flanged centrally-apertured domed end covers 2 bolted on to the ends of the body 1 by bolts 3 through the abutting flanges. The combustion chamber inside the pressure casing has three substantially tangential entries equally spaced around its periphery as seen in Fig. 2.

The combustion chamber is a hollow-walled chamber consisting of an inner skin and an outer skin separated by a narrow space for cooling air. The main structure consists of two centrally-apertured outer end plates 4a stiffened by six hollow ribs, those at one end being joined to those at the other by the same number of hollow ribs extending lengthwise of the chamber, at equally spaced intervals around its periphery. The periphery of each end plate 4a consists of three part-volute curves 4b, seen most clearly in Fig. 2, joined by radial or nearly radial steps 4c. The six channels 4d serving as the stiffening ribs for each plate 4a merge into an annular box around the central aperture, each of these ribs extending substantially tangentially from this box to the periphery of the plate. The edge of each plate 4a is turned up to form a flange around the plate continuous with flanges around the outer ends of the channels 4d, as indicated at 4f. Around the outside of the chamber, to complete the outer skin, is the enveloping plate 48, made up of three separate arcuate parts, with channels 4e forming the longitudinal hollow stiffening ribs.

The edges of the arcuate plates 4g, which include widened portions around the ends of the channels 4e, are bolted by bolts 14 to the peripheral flanges 4f on the end plates 4a.

The inner skin of the hollow walls of the combustion chamber, which conforms in shape to the outer skin, is made up of a number of separate finned plates connected by expansion joints. Thus each centrally-apertured end plate is made up of a number of sector plates 5a, partly exposed in Fig. 1 by the cutting away of the outer skin. The periphery of the inner skin is made up of a number of arcuate plates 5b, also partly exposed in Fig. 1. Each arcuate plate 5b is attached to one sector plate 5a at each end, to form the unit shown separately in side view in Fig. 4, the peripheral edge of plate 5a being turned over to form a flange to which the plate 5b is secured—e. g. by welding—as shown in the isometric detail view Fig. 5. The faces of the unit which are towards the outer skin— i. e. external faces of the combustion chamber—are provided with the cooling fins 5c which have the formation which can be best seen in Fig. 5. Adjacent units overlap along the radial edges of sector plates 5a and along the edges of the arcuate plates 5b; to form expansion-permitting tongue and groove joints. Each unit has a groove 5f formed along these edges by a raised strip 5d attached thereto as shown in Fig. 6, the grooves 5f being arranged to receive the edges of the next unit with a sliding fit. The plates 5a and 5b are of sheet metal and the fins 5c and strips 5b are attached by welding; the welding of the fins should be as nearly continuous as possible. Also welded to the plates 5a and 5b are the bosses 7 (see Figs. 2a and 3a) serving to space the inner skin apart from the outer skin by a narrow gap, and screwed studs 8 are welded to the bosses. The studs 8 pass through large clearing holes in the plates 4a and 4g of the outer skin and are fastened thereto by nuts 9, seen in Fig. 1, which secure the inner skin units while permitting their relative movement during expansion and contraction. If the sectors and arcuate members 5a and 5b be of cast metal the fins and grooves are cast integrally with them.

Located between the tubular ribs 4d and 4e are the slits 4k in the plates 4a and 4g constituting inlets to the interior of the hollow walls, which interior also communicates with the interior of all the hollow end and longitudinal ribs 4d and 4e through slits 4m in the plates 4a and 4g.

An annular groove 5h, similar to the grooves 5f along the edges of the sector plates 5a, is formed around the central aperture, in each end of the inner skin—for example by arcuate strips 5e similar to strips 5d also attached to the face of each sector plate (see Fig. 3b and Fig. 4). Fitting in this expansion-permitting groove in one end plate of the inner skin and also secured by bolts 10a to the adjacent end plate 4a of the outer skin is the rim of the flared end of the cylindrical tube 10 forming the axial outlet from the combustion chamber and seen in Fig. 3; secured to the inner ends of the channels 4d on the adjacent end plate 4a of the outer skin is the rim of the flared end of another cylindrical tube 11 surrounding tube 10 to constitute therewith an annular collector box into which the tubular ribs discharge. A tube 12 secured to the other of the end plates 4a extends into the combustion chamber towards tube 10 and constitutes a cooling air inlet. Around tube 12 and forming therewith another annular collector box is the tube 13 mounted on the end plates similarly to tube 10. These tubes are best seen in Fig. 3 but the flared end of tube 12 is visible in Fig. 1, and in that figure also the hollow wall is shown partly cut away to reveal the other end of tube 12 which is itself shown partly cut away to expose the end of tube 13.

The combustion chamber is mounted in the outer casing with free space all around for cooling air, the longitudinally hollow ribs 4e being mounted on the cylindrical wall 1 of the outer casing as shown in Figs. 1–3, by pairs of complementary mating members. One member of each pair, such as member 15, is fastened to one element of the combustion chamber and casing wall 1 respectively and is in the form of a tongue extending radially (with respect to the cylindrical wall 1) while the other member 16 is fastened to the other element and is in the form of a channel in which the tongue 15 is a sliding fit. A pair such as 15, 16, of which there is at least one for each rib 4e, has the channel extending axially; these, while permitting expansion and contraction, restrain the combustion chamber against bodily movement radially and circumferentially. Other similar pairs 17, 18 of which again there is at least one for each rib 4e, have the channels 17 extending circumferentially, to prevent longitudinal bodily movement.

A flanged inlet pipe 2a enters the central aperture in one of the end covers 2, adjacent to the tubes 12 and 13 (Figs. 1 and 3), and is welded or otherwise secured to the cover 2. A flanged outlet pipe 2b is similarly mounted on the other one of the end covers 2; the outlet tubes 10 and 11 on the combustion chamber enter the outlet pipe 2b.

Opposite to each of the three stepped portions 4c of the periphery of the combustion chamber, which are apertured to form the entries 28 for combustion air and fuel, is an aperture in the cylindrical part 1 of the outer casing from which projects substantially tangentially to the casing a flanged tubular part 1a. Bolted on to this part 1a by bolts 20 through the flanges is the flanged inlet head 19 which constitutes a right-angled pipe bend to which the combustion-air supply can be connected. Extending across the head 19 and held by the bolts 20 between the flanges of head 19 and the tubular part 1a of the outer casing is the inlet cover plate 21. The part 1a and the adjacent end of the head 19 are shown as of oval shape to accommodate a row of three burners. Each burner is enclosed by a tube 22, which may be the flame tube or a casing around the flame tube; the upper end of tube 22 is secured to the cover plate 21 and fits tightly in one of three apertures therein. Thus cooling air from the outer casing cannot get into the flame tube and cover plate 21 moreover shuts off communication between the cooling air in the outer casing and tubular part 1a and air in the inlet head 19. These tubes 22 are cylindrical at their upper ends but they change section smoothly to a rectangular shape at their lower ends, so that together they fill the tangential entry 28 of the combustion chamber in the step portions 4c. This shape of the tubes 22 can be seen in Fig. 1. In order to allow for their own thermal expansion and contraction and to prevent interference with expansion and contraction of the combustion chamber the lower ends of tubes 22 are not fastened to the combustion chamber but are a sliding fit in the entry, which they fill sufficiently to prevent any appreciable leakage of cooling air from the outer casing into the combustion chamber.

The burners 24 need not be illustrated and described in detail because their construction is no part of the present invention and each can be of some conventional form consisting for example of a flame tube inside the burner casing, a baffle for maintaining a stable zone of combustion, and a liquid-fuel injector, possibly of the air-blast type, inside the flame tube and supplied with the fuel and the blast air by a tubular stem 27 passing through the wall of the inlet head 19. The injector may be such that it can be unfastened from outside the head 19 and withdrawn for inspection or repairs; thus the injector may be that according to co-pending United States patent application Serial No. 254,881 of Bettison filed on November 5, 1951, and issued as Patent No. 2,719,056 on September 27, 1955.

In operation, combustion air, which will come from the compressor in a gas-turbine plant, is supplied to the inlet heads 19 and goes thence through the tangential entries to the combustion chamber interior for burning the fuel. Cooling air, which may be supplied by the same compressor, comes by way of the inlet pipe 2a into the outer pressure casing and washes over the exterior of the hollow-walled combustion chamber. Some air passes through each of the slits 4k around the periphery and in each endplate 4a of the outer skin and so into the hollow walls, over the cooling fins, and into the tubular ribs; the air entering the peripheral wall and reaching the longitudinal tubular ribs 4e divides, some going to the front and some to the back, to join the other cooling air which has entered by the slits in the end-plate 4a and so reached the tubular ribs 4a. The tangential entry of channels 4d into the annular collector boxes between tubes 10 and 11 and tubes 12 and 13 imparts to the air entering these boxes a swirl in the same direction as that imparted to the combustion air by the tangential entries, this reducing loss of pressure when the cooling air eventually mixes with the combustion products. The annular collector box on the outlet end, between tubes 10 and 11, extends to fit into the outlet 2b of the outer chamber and discharges an annulus of air along the inside of the wall of the outlet pipe.

The other collector box, between tubes 12 and 13, extends through the combustion chamber and discharges an annular core of air into the middle of the outlet pipe. The combustion products eventually emerge from the combustion chamber through the outlet tube 10 and then the outlet 2b with the two streams of cooling air, one of which envelopes the hot gases which the other forms a core through them.

What we claim is:

1. In combination, a volute chamber with a peripheral substantially tangentially directed inlet and a central axial outlet constituting a cyclone or vortex type combustion chamber, an outer casing enclosing said combustion chamber with space therearound for flow of cooling air over the said volute chamber, means for admitting cooling air to said outer casing and discharging said air from said outer casing with the combustion products from the interior of said chamber, said chamber being made up of an inner skin forming the volute chamber enclosing the combustion space and an outer skin of similar form enveloping the inner skin with a narrow gap between them, said skins thus constituting hollow walls, with their interior, formed by the gap between the skins, in communication with said outer casing and with said discharging means to define a flow path for cooling air through the said hollow wall, and means mounting and supporting said combustion chamber within said outer casing which mounting and supporting means permit thermal expansion and contraction of the combustion chamber relatively to the outer casing.

2. The combination according to claim 1 having a plurality of inlets to and outlets from the interior of said hollow wall affording several parallel paths for the cooling air.

3. The combination according to claim 1 wherein the said inner skin is in sections connected by expansion joints.

4. In combination, a volute chamber with a peripheral substantially tangentially directed inlet and a central axial outlet constituting a cyclone or vortex type combustion chamber, an outer casing enclosing said combustion chamber with space therearound for flow of cooling air over the said volute chamber, said combustion chamber having at least one substantially tangential entry opening in its periphery, and including an entry tube discharging tangentially into said entry, this tube being fixed to said outer casing but having a sliding fit in the combustion chamber entry to permit relative expansion and contraction, means for admitting cooling air to said outer casing and discharging said air from said outer casing with the combustion products from the interior of said chamber, and means mounting and supporting said combustion chamber within said outer casing which mounting and supporting means permit thermal expansion and contraction of the combustion chamber relatively to the outer casing.

5. A cyclone or vortex type combustion chamber having hollow walls made up of an inner skin having end walls and a circumferential wall enclosing a combustion space, a similar outer skin enveloping said inner skin with a narrow gap between said skins, and a plurality of tubular stiffening ribs on the end wall and circumferential wall of said outer skin to constitute the main structure of the combustion chamber, in combination with an outer casing enclosing said combustion chamber, with space around the latter for flow of cooling air over the outside of said outer skin, inlet means for admitting cooling air to said outer casing and outlet means for discharging said air from the casing with the combustion products from the combustion chamber, and mounting means on said ribs for supporting said combustion chamber in the outer casing with freedom for thermal expansion of the combustion chamber relatively to the outer casing, the said outer skin of the combustion chamber being apertured to admit cooling air from the outer casing into the gap between said skins constituting the hollow wall, the said tubular ribs constituting ducts between the interior of the hollow wall and said outlet means.

6. The combination according to claim 5 including, as part of each end wall of said combustion chamber, an annular air-collector box into which said tubular ribs discharge substantially tangentially, each of said collector boxes being located to discharge into said outlet means.

7. The combination according to claim 6 including a first tube extending axially outwardly from said annular air-collector box at one end of the combustion chamber, a second tube similarly extending from said inner skin at that end, within the first tube, to define an axial outlet from the combustion chamber, the first and second tubes defining between them an air outlet into which some of the said tubular ribs discharge through said collector box, a third tube extending into the combustion chamber from the other of said collector boxes at the other end of the chamber to define an axial passage for a core of cooling air from the said outer casing through the combustion chamber and a fourth tube similarly extending from the said inner skin around the third tube to define therewith another air outlet into which the rest of the said tubular ribs discharge through said other collector box.

8. A cyclone or vortex type combustion chamber, which is a volute chamber having at least one tangential air entry and an axial outlet for combustion gases, consisting of hollow walls made up of an inner skin in the form of a volute chamber, a similar outer skin enveloping the inner skin with a small gap between the skins and a plurality of tubular stiffening ribs on the outer skin constituting ducts from the interior of said hollow walls to said axial outlet, the said outer skin being apertured to admit the passage of cooling air into and through the hollow walls and being further apertured to admit air from the hollow walls into the said tubular ribs and thence to the said outlet.

9. A cyclone or vortex type combustion chamber, which is a volute chamber having at least one tangential air entry thereto and an axial outlet for combustion gases, consisting of inner and outer skins spaced apart by a narrow gap to form two hollow end walls and a hollow peripheral wall joining them, a first hollow-walled tube extending axially outward from one of said end walls to form said axial outlet, a second hollow-walled tube extending axially inward from the other of said end walls to constitute an axial passage for cooling air into and through the combustion chamber, a plurality of hollow tubular stiffening ribs on said end walls radiating substantially tangentially out from said tubes to the periphery of the chamber, in communication with the hollow interior of the said end walls and said tubes, and a plurality of tubular stiffening ribs extending axially on the said outer skin of said peripheral wall to join together the ends of said ribs on said end walls, the outer skin being perforated, on both the end and peripheral walls, between the said ribs, to admit cooling air to the interior of the hollow walls.

10. A cyclone or vortex type combustion chamber having a peripheral tangential air inlet and a central gas outlet comprising in combination a centrally apertured end wall made up of a plurality of overlapping plates and means forming joints between them permitting relative thermal expansion and contraction, a second and similarly made up end wall coaxially spaced from the first, an apertured peripheral wall uniting the said end walls to complete the chamber, also made up of plates and means forming joints between them permitting relative thermal expansion and contraction, means for directing fuel through an aperture in said peripheral wall, a skeleton structure enveloping and supporting the said end and peripheral walls, made up of two end structures each formed of tubular ribs radiating from the middle part of one of said end walls and a plurality of tubular ribs extending between and joining the ends of the ribs of the said end structures, means fastening at least one of said end and peripheral walls to said skeleton structure with freedom for thermal expansion and contraction, and supporting means for said chamber attached to the said skeleton structure thereof.

11. A combustion apparatus of cylone or vortex type comprising in combination an outer casing with inlet and outlet apertures, a hollow-walled volute combustion chamber within said outer casing with at least one tangentially directed air inlet in its outer periphery and with its end centrally apertured, an outer and an inner skin spaced apart to constitute the said hollow walls of said volute chamber, the outer skin and the outer casing defining between them a path for passage of a first and outer layer of cooling air over the said combustion chamber, while the skins define between them a path for the passage of a second and intermediate layer of cooling air, an inlet tube extending into said combustion chamber through said aperture in one end thereof to define a path for entry into the combustion chamber of a third and inner layer of cooling air as an axial core, and an outlet tube extending from the said aperture in the other end of the combustion chamber.

References Cited in the file of this patent
UNITED STATES PATENTS

| | | |
|---|---|---|
| 1,618,808 | Burg | Feb. 22, 1927 |
| 2,080,425 | Lysholm | May 18, 1937 |
| 2,268,464 | Seippel | Dec. 30, 1941 |
| 2,470,126 | Altorfer | May 17, 1949 |
| 2,477,683 | Birmann | Aug. 2, 1949 |
| 2,547,619 | Buckland | Apr. 3, 1951 |
| 2,552,492 | Nathan | May 8, 1951 |
| 2,555,965 | Garber | June 5, 1951 |
| 2,615,300 | Lombard | Oct. 28, 1952 |

FOREIGN PATENTS

| | | |
|---|---|---|
| 615,680 | Great Britain | Jan. 10, 1949 |
| 963,507 | France | Jan. 4, 1950 |